May 10, 1938.  M. HURST ET AL  2,117,248
APPARATUS FOR CONTROLLING THE AMOUNT OF FUEL
DELIVERED BY AN INJECTION PUMP
Filed Sept. 3, 1935  3 Sheets-Sheet 1
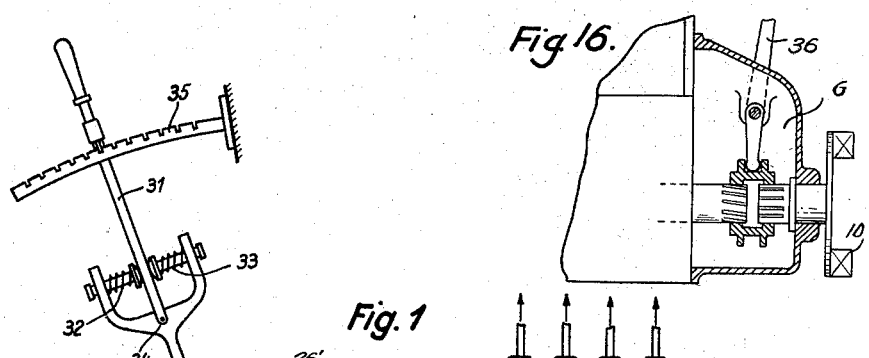
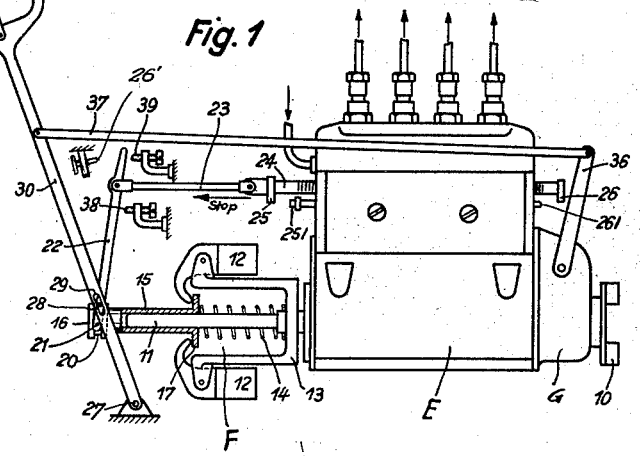
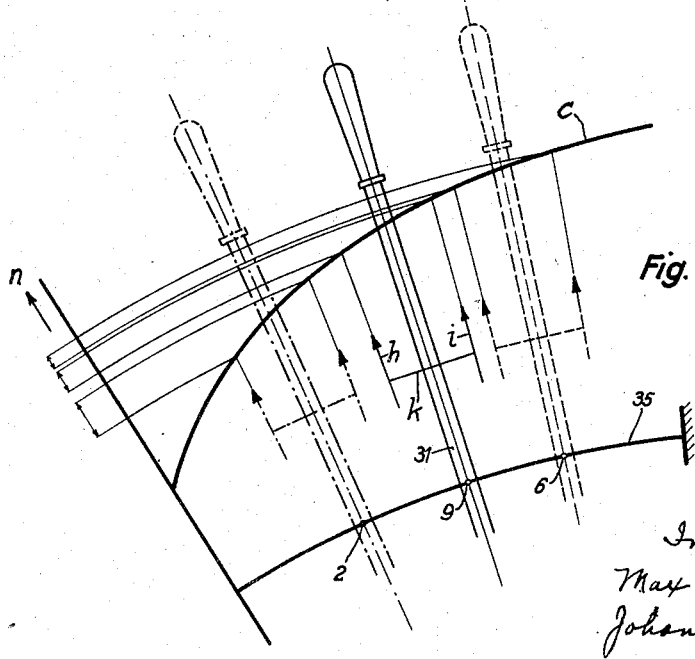

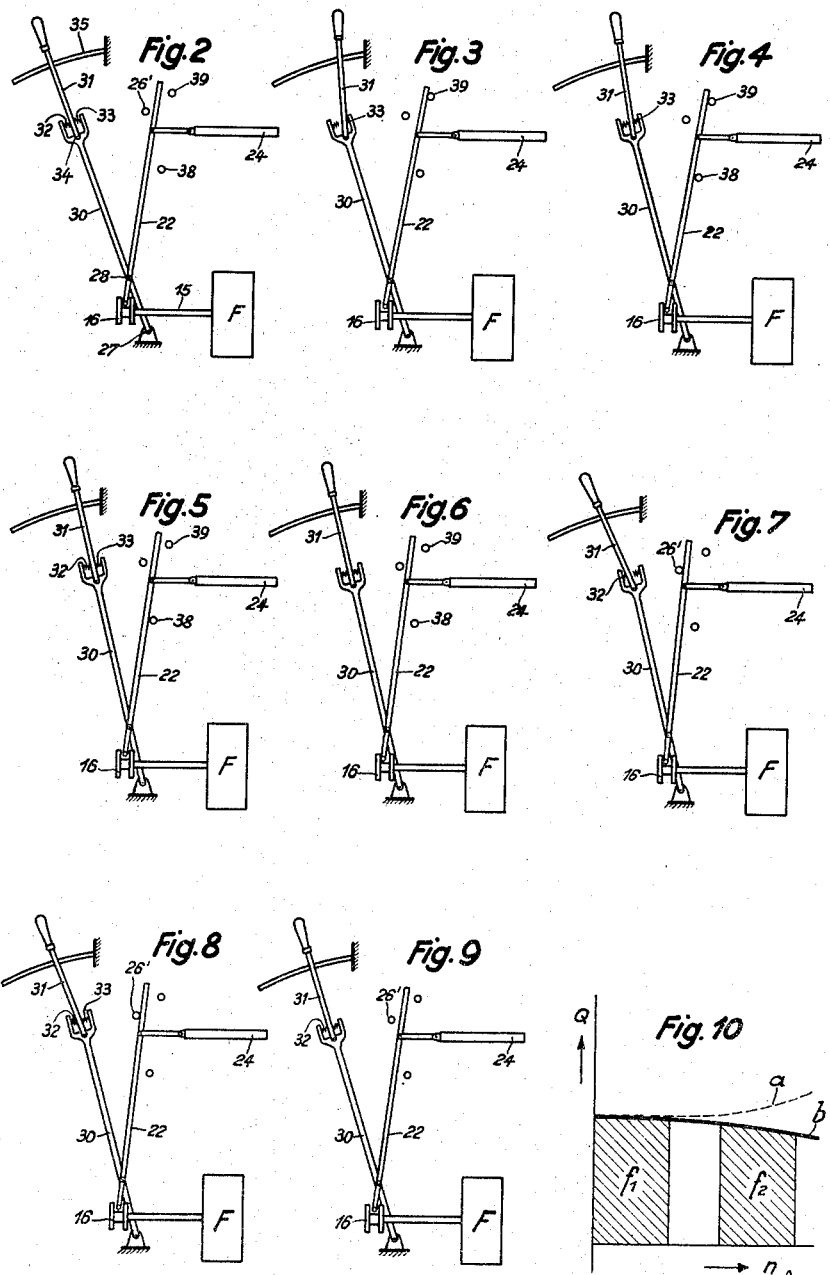

May 10, 1938.　　　M. HURST ET AL　　　2,117,248
APPARATUS FOR CONTROLLING THE AMOUNT OF FUEL
DELIVERED BY AN INJECTION PUMP
Filed Sept. 3, 1935　　　3 Sheets-Sheet 3
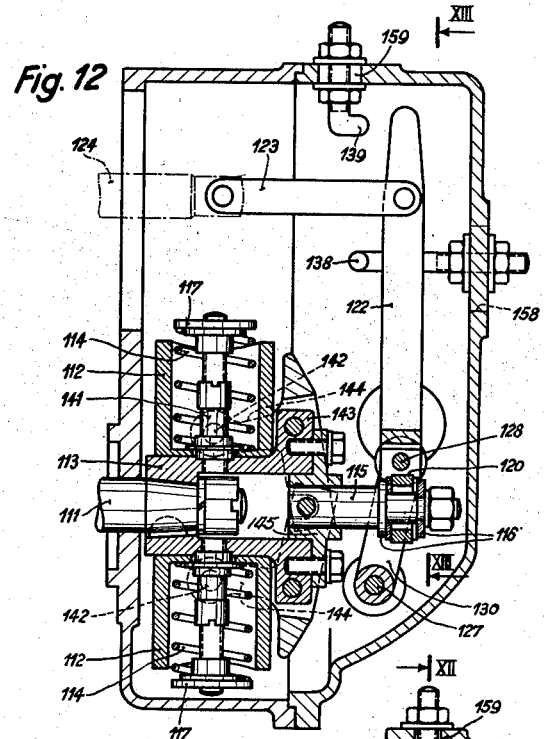
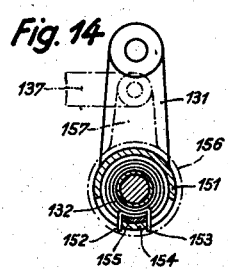
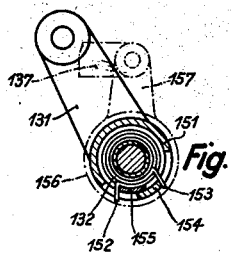
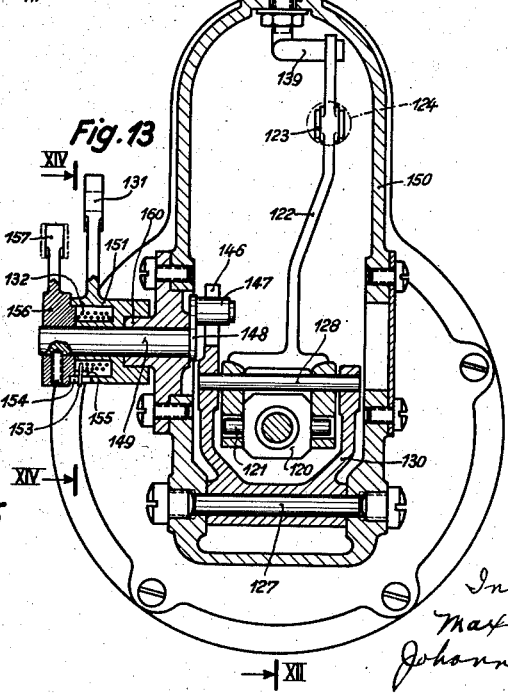
Inventors
Max Hurst
Johannes Weber
By Steward & McKay
their attorneys Patented May 10, 1938

2,117,248

UNITED STATES PATENT OFFICE 2,117,248

APPARATUS FOR CONTROLLING THE AMOUNT OF FUEL DELIVERED BY AN INJECTION PUMP

Max Hurst, Stuttgart, and Johannes Weber, Stuttgart-Feuerbach, Germany, assignors to Robert Bosch Gesellschaft mit beschränkter Haftung Application September 3, 1935, Serial No. 39,080 In Germany September 25, 1934

8 Claims. (Cl. 123—140)

The invention relates to an arrangement for governing the amount of fuel delivered by an injection pump having a member for governing the injection amount delivered to an engine, which governing member is subject to the action of an adjusting member responsive to alterations in the speed of the engine and of a further adjusting member, which, for example, is operable at will. In the known apparatus of this kind simply the idle running speed is controlled and the maximum speed limited. The known governor has for this purpose two springs or pairs of springs, which counteract the adjusting forces of centrifugal weights, the weaker springs being intended for the idle running speed range, and the stronger ones for the maximum speed range. In the region lying between these speeds the governor is therefore inoperative and in consequence in this region it has been necessary to adjust the particular working speed desired by means of an operating lever, a pedal or the like, and to maintain such speed by the constant operation of such device.

The object of the invention is to provide a governing arrangement, whereby any speed lying within the said limits, and hitherto only maintained by the voluntary operation of a pedal or the like, can be kept constant by the device which responds to variations in speed, so that the setting of a voluntarily adjustable device may serve only for adjusting or setting a desired working speed, which is afterwards automatically maintained by the governor independently of the fluctuations of load on the engine.

In the present invention this object is attained by introducing between the adjusting member, which alters its position on alterations of speed, and the delivery amount governing member of the pump, a transmission which adjusts this member by the full governing range for the amounts of fuel delivered within the speed range determined by the degree of variation permitted. Fluctuations in speed occurring at a desired speed and within the permissible degree of variation thus control in this invention the total available governing range for the fuel amounts delivered.

By this means, the advantage is obtained that a greater amount of fuel corresponding to the required greater power output is automatically supplied to the engine, fitted, for instance, in a vehicle, when hill-climbing at a quite low speed, and that at high speeds occurring when running down-hill a reduced amount of fuel corresponding to the reduced power output is also automatically delivered and injected. By this means, the speed preferable for a particular kind of country need only be once adjusted. The supply of fuel necessary for maintaining this speed is regulated in proportion to the necessary output by the governor which is responsive to variations in the speed.

Owing to the form of transmission necessary in achieving the object of the present invention between the adjusting paths and the path of the injection amount governor, one of the end-positions of displacement of the injection-amount governor is reached practically at each alteration in position of the adjusting lever effected at will by the operator. A movement of the operating lever having, for example, for its object to accelerate the engine, thus first causes the position of the injection-amount governor appertaining to the greatest injection amount to be reached. This is a very essential advantage, since the output of the engine is considerably increased during the transition to a higher speed. The resistances to acceleration can be easily and quickly overcome. In order then to enable the governor, after completing the voluntarily effected adjustment operation, to automatically assume the governing position corresponding to the desired speed range, in further carrying out the invention already explained, an elastic flexible trailing coupling pre-tensioned in both adjusting directions, is inserted between the voluntarily adjusted operating lever and an intermediate member which transmits its movements to the controlling rod, which trailing coupling is tensioned by the voluntarily adjustable lever and thereby supplies an additional force which, according to the direction of adjustment additionally loads or relieves the rod of the injection-amount governor. Under the action of this latter, more or less fuel is supplied to the engine for such a length of time until, owing to the alteration in speed hereby caused, the adjusting member of the controlling rod that is dependent on speed, and thus also the intermediate member, has moved into a position which causes the equalization of pressure in the trailing coupling. With this position the adjusted speed is attained, which is afterwards maintained by the speed governor within the permissible degree of variation. A master control for the speed governor is thus automatically obtained by the alterations in position of the vountarily adjusted lever. For carrying out an alteration of speed, only the comparatively slight pressure of the trailing coupling, and not, as in the previously known speed governors, the very great counter-force of the governor springs, has to be overcome.

The invention is more particularly described with reference to the accompanying drawings which illustrate two examples of construction, and in which:—

Figure 1 is a diagrammatic illustration of one form of construction, and

Figures 2–9 are diagrammatic illustrations of the construction illustrated in Figure 1 with the operative parts in various working positions.

Figures 10 and 11 are two diagrams explanatory of the mode of working.

Figures 12 and 13 are side and end views respectively, of a modified form of construction of the invention, with Figure 12 a section on the line XII—XII of Figure 13, and Figure 13 a section on the line XIII—XIII of Figure 12.

Figures 14 and 15 illustrate the trailing coupling of the construction according to Figures 12 and 13 in different working positions, the figures being sectional views on the line XIV—XIV of Figure 13.

Fig. 16 is a detail view, in longitudinal cross-section, of the injection timing adjuster.

On the shaft 11 of an injection pump E, driven by a clutch 10 from an internal combustion engine (not shown), is arranged a centrifugal governor F, which consists essentially of two centrifugal weights 12, mounted in overhanging relationship on a carrier 13, and a sleeve 15, having a yoke 16, and movable by these weights against the action of a spring 14. The spring 14 is supported at one end by a flange 17 of the sleeve 15.

A governor lever 22 is mounted so as to rock about a pivot 21, on a slide-block 20 of the yoke 16, to which lever a controlling rod 24, governing the injection amount delivered by the pump in known manner, is connected by a link 23. The controlling rod 24 has two projections 25 and 26, which are adapted to contact with two stops 25ı and 26ı, adjustable on the casing of the pump E, in the end-positions corresponding to the greatest and the smallest injection amounts.

An intermediate lever 30, pivoted to the governor lever 22 by means of a pin 28 in a slotted guide 29 is also pivoted at 27 to a stationary support while a bifurcated free end of this lever carries two springs 32 and 33, which engage and press in opposite directions upon an operating lever 31, which is mounted on the lever 30, by means of a pin 34 and is displaceable under the control of a guide-bar 35. An injection timing adjuster, indicated generally by G and shown in detail in Fig. 16. which is adapted to adjust the beginning of the injection period in dependence on the speed, is connected through a lever 36, and a pivotal link 37 with the lever 30. Two stops 38 and 39, which are adjustable both in height and also in direction are disposed within the range of movement of the governor lever 22, and about these stops the lever 22 tilts during the longitudinal displacement of the governor yoke 16, and thereby moves the controlling rod 24 in such a way that at a high engine speed, and the then impaired degree of admission, the injection amount delivered to the engine is reduced, while at a low speed, on the other hand, more fuel is sprayed in. By adjusting the position as regards height of these stops, the ratio of the additional or reduced amount of fuel supplied to the engine can be adjusted relative to the injection amount, which was supplied to the engine during the unimpeded movement of the governor lever 22.

The mode of working of the apparatus is diagrammatically illustrated in Figures 2–9, in which the essential parts of the apparatus illustrated in Figure 1 are diagrammatically represented in various adjusting and governing positions.

Fig. 2 shows the position of the parts when the engine is running at its slowest speed. If the speed is to be increased, the operating lever 31 is rocked to the right to take up a position shown in Fig. 3. As a result the spring 33 is compressed, and the lever 30 presses the governor lever 22 against the upper stop 39. A further adjustment of the lever 22 is at first impossible, because the comparatively slight compression of the spring 33 is opposed by the great force of the governor spring 14. In this position of the parts the levers 30 and 31 thus form an obtuse angle to one another, and the position of the governor rod 24 already reached, is consistent with a supply of a greater amount of fuel to the engine. In consequence, the engine increases its speed.

The yoke 16 of the now accelerated centrifugal governor F carries the yoke end of the governor lever 22 into a middle position (Fig. 4), i. e. it now bears on the stop 38. In this position the action of the spring 33, in striving to equalize its tension, is to tend to maintain the governor rod 24 in a position corresponding to the full load amount. As however, in the meantime, the speed has been increased, the governor lever 22 assumes another position under the influence of the centrifugal governor, i. e. it rocks about the stop 38, and as shown in Fig. 5, on reaching the desired end position by the adjustment of the operating lever according to Fig. 2, is quite lifted from the stop 39. The injection amount is thus reduced as the speed increases, by virtue of the fact that the governor lever, in regard to the point of action of the controlling rod, having originally functioned as a one-armed lever, now acts as a double-armed lever in the range of higher speeds. The controlling rod 22 makes in this range an adjusting movement whereby the injection amount is reduced.

In the meantime, the governor sleeve reaches the position shown in Fig. 6, in which the compression of the spring 33 is in equilibrium with the opposing spring 32. There is now no longer a counterforce additionally loading the controlling lever and rod 22, 24, and the governor lever 22 is now solely under the influence of the centrifugal governor F, which tends to maintain within the permissible degree of variation the speed adjusted by the levers 30 and 31. (Fig. 6).

Figs. 7–9 show the transition to a lower speed and the movements which then take place. First, the desired speed is adjusted by means of the operating lever 31, movement to the left causing the spring 32 to be compressed. This presses the controlling rod 24 against the stop 26ı' (Fig. 7) by means of the intermediate lever 30 and the governor lever 22. As a result the engine receives less fuel, and its running is retarded. The yoke 16 moves to the left owing to the point of action of the lever 22, and the controlling rod moves, under the action of the expanding spring 32, through the position shown in Fig. 8 into that shown in Fig. 9, in which the action of the spring 32 on the rod is again removed and the controlling rod simply stands under the influence of the speed governor F, which now maintains the adjusted lower speed.

From this description of the operation, the advantages which the arrangement described in connection with Fig. 1 and a further suitable embodiment of the original invention, and forming an addition to the "injection timing adjuster", have as compared with known arrangements, are apparent. In these latter, the injection period is at once altered by the adjusting movements which effect the alterations in speed. The injection thus takes place at first at a time which is not favourable for the speed range still then existing. It is only when the engine has attained the adjusted speed that this discordance, i. e. between the speed and the injection period, which gives rise to premature or delayed ignition, knocking phenomena, and imperfect combustion, ceases. These drawbacks occurring during the transition to a different speed are avoided in the present invention, as the adjusting rods (37, 36) of the injection timing adjuster are pivoted to the intermediate lever 30 forming a part of the controlling rods, which lever is under the master control of the operating lever 31 only under the action of the trailing coupling (32, 33). The "injection timing adjuster", in this case, thus automatically follows the variations in speed. That is to say, the most favourable injection period for the particular speed is maintained even during the adjusting movement.

Figure 10 shows the action of the stops 38 and 39, by which the injection amount is adapted to the admission conditions dependent on the speed. The diagram shows the dependence of the injection amount on the speed with a given uniform output. The curve $a$ shown in broken lines shows the course of the injection amount delivery without the stops; curve $b$ the fuel requirement of the engine, which coincides with the injection amount regulated by the stops. In the speed-injection amount range represented by the hatched area $f_1$ the stop 39 controls the movement of the governor lever 22, a region then follows in which the lever 22 is controlled only by the yoke 16 while in the region of the hatched area $f_2$, the stop 38 is effective. This adaptation of the injection amount to the fuel requirement is obtained in that by the tilting movements of the governor lever 22 caused by the stops, the paths of the controlling rods become smaller as the speed increases as compared with the unity of the path of the governor sleeve. By adjusting the stops, the lengths of the lever arms limited by them, and also the movement distances to be freely traversed by the governor lever, can be altered, and thereby the course of the alteration of the injection amounts adapted to the fuel requirement curve of any desired internal combustion engine with an exactitude which perfectly suffices for practical requirements. In pumps having a different delivery curve from that shown, one of the two stops 38 or 39 may be omitted if necessary.

In the diagram constituting Figure 11, the stroke of the sleeve 16 in dependence on the speed (curve $c$) is shown by radial vectors corresponding to the positions of the lever 31 and based on a curved line representing the guide path 35 of said lever, which is shown in the diagram in the three positions 2, 6 and 9 represented by the positions of the lever 31 in Figures 2, 6 and 9, respectively. The stretch $k$ provided by the arrows $h$ and $i$ characterizes the throw of the centrifugal weight possible when an equalization of tension on the trailing coupling occurs, that is to say, the throw which is necessary to move the controlling rod 24 by the full governing range for the injection amounts. The straight lines traversed by the arrows $h$ and $i$ thus limit on the curve $c$ the speed ranges within which the engine works at each position of the lever. The operating lever 31 thus selects, as it were, from the total speed range smaller ranges lying within the permissible limits of variation, which are maintained by the speed governor. The diagram shows that when using a single governor spring controlling the entire speed range, the irregularity is greater at low speeds than at high speeds. So far as this is not desirable, two or more springs coming successively into operation can be arranged in the speed governor F of Figure 1.

In the example of construction shown in Figures 12–15, a hub 113 on the shaft 111 of the injection pump (not shown) has two guide spindles 141 for two centrifugal weights 112. The centrifugal weights are loaded by two springs 114 which bear against two adjustable abutments 117. To two pins 142 arranged on the centrifugal weights 112 is pivoted one arm of each of two elbow levers 144, which are pivotally mounted in extensions 143 of the hub 113, and are connected with their other arms to a bolt 115 sliding in a bearing 145. This bolt carries a yoke 116 in which a slide-block 120 is mounted. On this latter two pins 121 connected to the forked end of a double-armed governor lever 122 are provided.

The lever 122 is pivotally mounted on a lever 130 by means of a bolt 128 passing through its forked end, and this lever 130, which is also forked, is itself mounted on a bolt 127 provided in the governor casing 150. One end of the lever 130 has a guide-slot 146, engaged by a crank-pin 147 provided on a crank-arm 148, which is revolubly mounted by means of a shaft 149 in an extension 160 of the casing 150. On the outwardly projecting end of the shaft 149 an overhanging lever 131 is mounted by means of a hollow bush 151.

In the interior of the bush is arranged a torsion spring 132 wound in two layers, the cranked ends 152 and 153 of which embrace two driving members 154 and 155, one of which (154) is provided on the bearing bush 151, and the other on a hub 156 of a lever 157 connected to the end of the shaft 149. To this lever 157 is pivoted a link 137 leading to the "injection timing adjuster G", while the lever 131 is connected to an operating lever (not shown) having a foot pedal or the like. A link 123 leading to a controlling rod 124 is connected to the double-armed governor lever 122; in the path of movement of this lever are arranged two stops 138 and 139, the ends of which are threaded so as to be adjustably mounted by means of nuts in slots 158 and 159 of the casing 150. The parts which have the same task in the governing operation have, as regards the last two sentences, received coincident reference numerals with one hundred added in the modified form, for example, the stops 138, 139 function exactly as the stops 38, 39 of the first form. The mode of working of the coupling will be seen from Figures 14 and 15. Figure 15 shows the position of the trailing coupling directly after the termination of an adjusting movement produced by means of the lever 131, in which the spring 132 was compressed. Its force acts through the shaft 149 and the crank-pin 147 on the rocking lever 130, whereby the effects already described are produced.

Instead of the centrifugal governor, any other suitable adjusting device responsive to alterations in speed may be employed.

We declare that what we claim is:

1. Apparatus for controlling the amount of fuel delivered to an engine comprising a governing member the position of which determines the quantity of fuel delivered to said engine, governor means displaceable in accordance with the speed of said engine, transmission mechanism between said governing member and said governor means, a manually operated lever, an intermediate member pivotally connecting said lever with said transmission means and an elastic flexible trailing coupling, pretensioned in both directions of adjustment, between said manually operated lever and said intermediate member, manual displacement of said operating lever compressing one element of said trailing coupling to displace said governing member through said transmission mechanism to vary the amount of fuel injected and cause variation in speed of said engine, said displacement being effected for such a period until the governor means and the transmission mechanism have moved into a position to permit equalization of tension in the coupling, whereupon said governor alone operates to control the injection amount delivered to said engine.

2. Apparatus for controlling the amount of fuel delivered to an engine comprising a governing member the position of which determines the quantity of fuel delivered to the engine, governor means displaceable in accordance with the speed of said engine, transmission mechanism between said governing member and said governor means, a manually operated lever, an intermediate pivoted member between said lever and said transmission mechanism, and a resilient coupling between said manually operated lever and said intermediate member which opposes a resilient load on said governor member, displacement of said manually operated lever, through said intermediate member and said transmission mechanism, displacing said governing member over a complete range within predetermined limits to vary the amount of fuel delivered to the engine to cause alteration in speed until under the action of the governor the coupling between said manual lever and said intermediate member has moved into a position of equilibrium.

3. Apparatus for controlling the amount of fuel delivered to an engine comprising a governing rod the position which determines the quantity of fuel delivered to said engine, a spring loaded governor having a member displaceable in accordance with the speed of said engine, a governor lever pivoted at one end to said member and adjacent the other end to said rod, a manually operated lever, an intermediate lever pivotally connecting said manually operated lever with said governor lever through pin and slot mechanism, an elastic flexible coupling between said manually operated lever and said intermediate lever, displacement of said manually operated lever causing displacement of said governing rod within predetermined limits to cause variation of the amount of fuel injected to said engine and consequential variation in speed, said variation continuing until said flexible coupling returns to a position of equilibrium whereupon variations in load on said engine to effect the speed are controlled by said governor alone.

4. Apparatus as claimed in claim 3 and including at least one adjustable stop arranged in the path of displacement of said governor lever for limiting the displacement thereof on actuation by said manually operated lever.

5. Apparatus as claimed in claim 3 and including adjustable stops in the path of displacement of said governor lever for limiting the displacement thereof on actuation of said manually operated lever, one of said stops functioning as a fulcrum about which said governing lever rocks when in one limiting position on actuation of said lever by said governor.

6. Apparatus as claimed in claim 3 including a rocking lever having a guide slot therein and on which said governor lever is mounted, a casing for said governor on which said rocking lever is pivotally mounted, a crank arm rockably mounted in said casing, a crank pin on said crank arm engaging in said guide slot of said rocking lever, a manually operated lever coupled with said rocking lever, and a hollow bush on which said manually operated lever is mounted in overhanging relationship, said bush containing a torsion spring coupling between said manually operated lever and said rocking lever.

7. Apparatus for controlling the amount of fuel delivered to an engine, comprising a governing member the position of which determines the quantity of fuel delivered to said engine, spring-loaded governor means displaceable in accordance with the speed of said engine, a floating lever pivotally connected to said governing member and said governor means, a manually operated lever, a pivoted intermediate member pivotally connected at its swinging end to said manually operated lever and intermediate its ends to said floating lever, a resilient coupling between said manually operated lever and said intermediate member, and at least one stop arranged in the path of movement of said floating lever, said floating lever adapted to pivot about an axis passing through either one of its points of connection to said governing means and intermediate lever according to the operation of said governing means and intermediate lever.

8. Apparatus as set out in claim 3 in which the intermediate lever is forked and pivotally supports between the forked ends thereof one end of the governor lever, said governor lever also being forked to embrace between the forked ends thereof the displaceable member of said governor.

MAX HURST.
JOHANNES WEBER.